United States Patent [19]

Lyzohub

[11] Patent Number: 4,852,765
[45] Date of Patent: Aug. 1, 1989

[54] FUEL TANK WITH BLADDER

[75] Inventor: Walter A. Lyzohub, Redford, Mich.

[73] Assignee: Chrysler Motors Corporation, Highland Park, Mich.

[21] Appl. No.: 243,368

[22] Filed: Sep. 12, 1988

[51] Int. Cl.[4] ...................... B65D 88/16; B65D 90/28
[52] U.S. Cl. .................................. 220/461; 220/5 A; 220/85 VS; 220/465; 280/834
[58] Field of Search .................. 220/5 A, 85 VS, 403, 220/461, 465, 900; 280/5 A

[56] References Cited

U.S. PATENT DOCUMENTS

| 3,409,714 | 11/1968 | Strugar | 280/5 A X |
| 3,477,610 | 11/1969 | Hansen . | |
| 3,648,886 | 3/1972 | Pringle | 220/465 X |
| 3,887,104 | 6/1975 | Cole . | |
| 4,625,980 | 12/1986 | Lyzohub . | |

Primary Examiner—Gerald A. Michalsky
Attorney, Agent, or Firm—Kenneth H. MacLean, Jr.

[57] ABSTRACT

A fuel tank with a sheet metal outer enclosure and an inner resilient liner overlying the outer enclosure with the upper surface of the liner being mold formed into a configuration suitable to act as a movable bladder to thus separate the tank interior into a variable volume fuel space and air space.

4 Claims, 2 Drawing Sheets

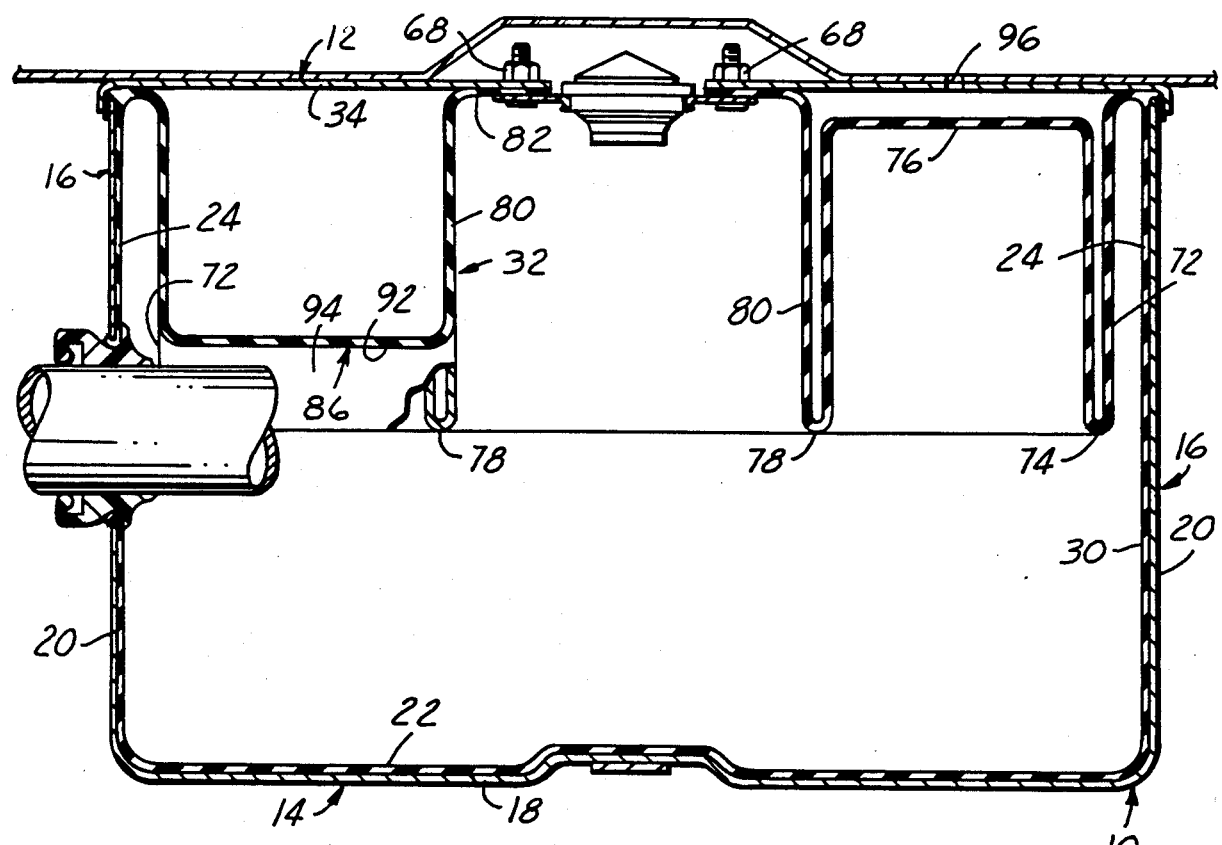
FIG.3
FIG.4
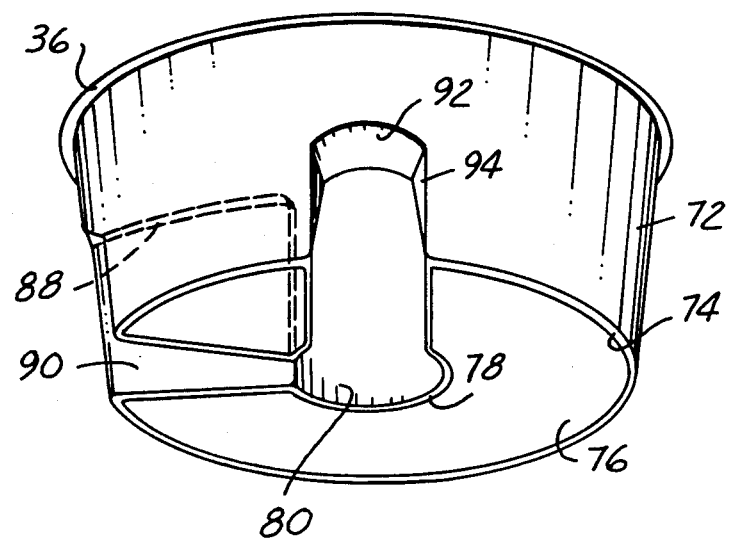

FUEL TANK WITH BLADDER

BACKGROUND OF THE INVENTION

A fuel tank having an outer metal shell and an inner liner of elastomeric material is known and disclosed in U.S. Pat. No. 4,625,980 to Lyzohub. Also, a fuel tank with a resilient diaphragm or bladder is known and disclosed in U.S. Pat. No. 3,477,610 to Hansen and in U.S. Pat. No. 3,887,104 to Cole. The Lyzohub patent does not provide for a resilient bladder or diaphragm to separate liquid fuel from the remainder of the space in the fuel tank. In a typical fuel tank used in automobiles, the remainder of the fuel tank may be referred to as the "air space" although the space is actually filled with a mixture of air and fuel vapor. In filling a fuel tank of this type, the fuel vapor is pushed out of the tank by the new liquid fuel. This vapor will enter the atmosphere unless some means is provided to capture the vapor. Such a capture means represents a costly way to prevent the escape of the vapor.

The above identified Hansen patent discloses a fuel storage tank such as would be buried underground at a gas station. The tank interior includes a liner or resilient material overlying inner walls of an outer housing. The liner is attached to the fill opening of the tank so that fuel is introduced in the space defined by the liner. As liquid fuel leaves the tank, the liner separates from the outer walls of the tank and follows the decreasing liquid fuel level. The space between the liner and the outer housing increases in volume as fuel leaves the tank thus defining a true air space in that the space does not contain air and fuel vapor. Such an arrangement does not produce the above described discharge of vapor from the tank.

The previously identified Cole patent also discloses a lined fuel tank with bladder means to separate liquid and vaporous fuel from an air space. In Cole, the fill tube and outlet tube are located at one end of the tank interior. This arrangement requires only that portion of the liner adjacent the tubes to maintain contact with the tank wall and frees the remaining portion of the liner to separate from the tank wall as the liquid fuel level decreases. The space between the liner and the outer tank wall thus defines an air space.

SUMMARY OF THE INVENTION

From the previously provided background, it is clear that lined fuel tanks are generally old. Also, the provision in a tank of a movable wall to separate fuel from an air space is generally old. The subject invention is a lined fuel tank in which the upper wall of the liner is molded into a particular configuration so that the upper wall moves with liquid fuel level changes in the tank. The configuration of the upper wall designed to provide a very efficient separation of the fuel from the air space.

The upper wall of the liner in the subject embodiment includes outwardly and inwardly positioned nearly vertically extending wall portions and a generally horizontally extending intermediate wall portion joining the other two wall portions at lower edges. The upper wall of the liner is centrally attached to the top of the outer fuel tank housing. The connection of the vertical wall portion to the horizontal wall portion is configured with a rounded profile. This rounded profile tends to direct the vertical wall portion to fold back and roll back over itself as the horizontal wall portion moves upward due to an increased liquid fuel level in the tank. Likewise the vertical wall rolls back over itself to allow the horizontal wall to move downward as the fuel level in the tank decreases.

In addition, provision is made through the previously described upper wall of the liner for passage of a stationary filler tube or an outlet tube. Specifically, a arch is formed for either of the tubes which generally extends radially inward through the liner's upper wall. The arch is provided by a wall portion spaced upwardly from the intermediate wall and a pair of spaced side walls. The upwardly spaced wall portion is stationary as the intermediate wall portion moves in response to the changes in the fuel level.

The subject fuel tank with the integral liner and specifically configured upper surface has other advantageous features which will be more obvious after a reading of the following detailed description of an embodiment, reference being had to the following drawings of a specific embodiment.

IN THE DRAWINGS

FIG. 1 is an elevational and partially sectioned view of the fuel tank and bladder in an empty condition; and FIG. 2 is a sectioned elevational view of the empty fuel tank and bladder taken along section line 2—2 in FIG. 1 and looking in the direction of the arrows; and FIG. 3 is a sectioned view of a full fuel tank but otherwise like FIG. 2; and FIG. 4 is a bottom perspective view of the bladder shown in the other figures.

DESCRIPTION OF A PREFERRED EMBODIMENT

Figure 1:
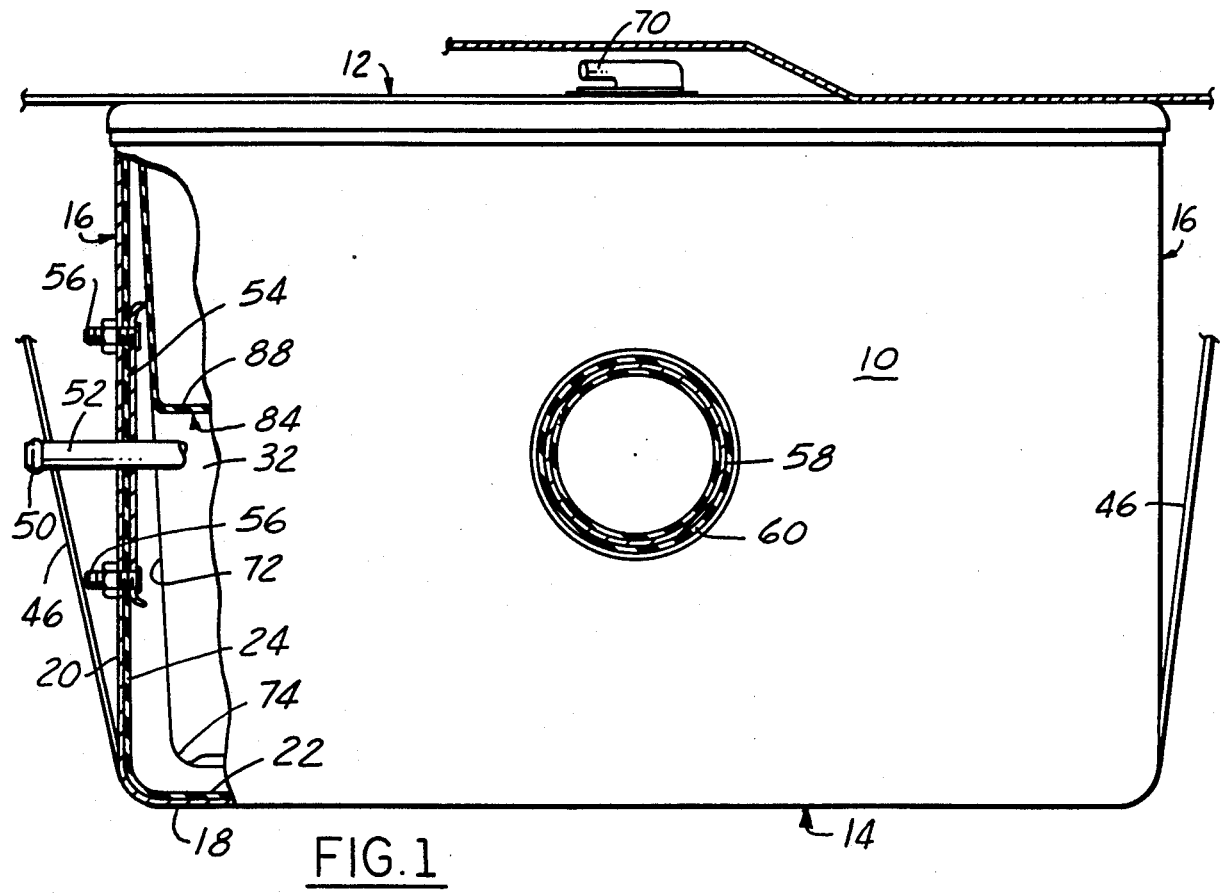
Figure 2:
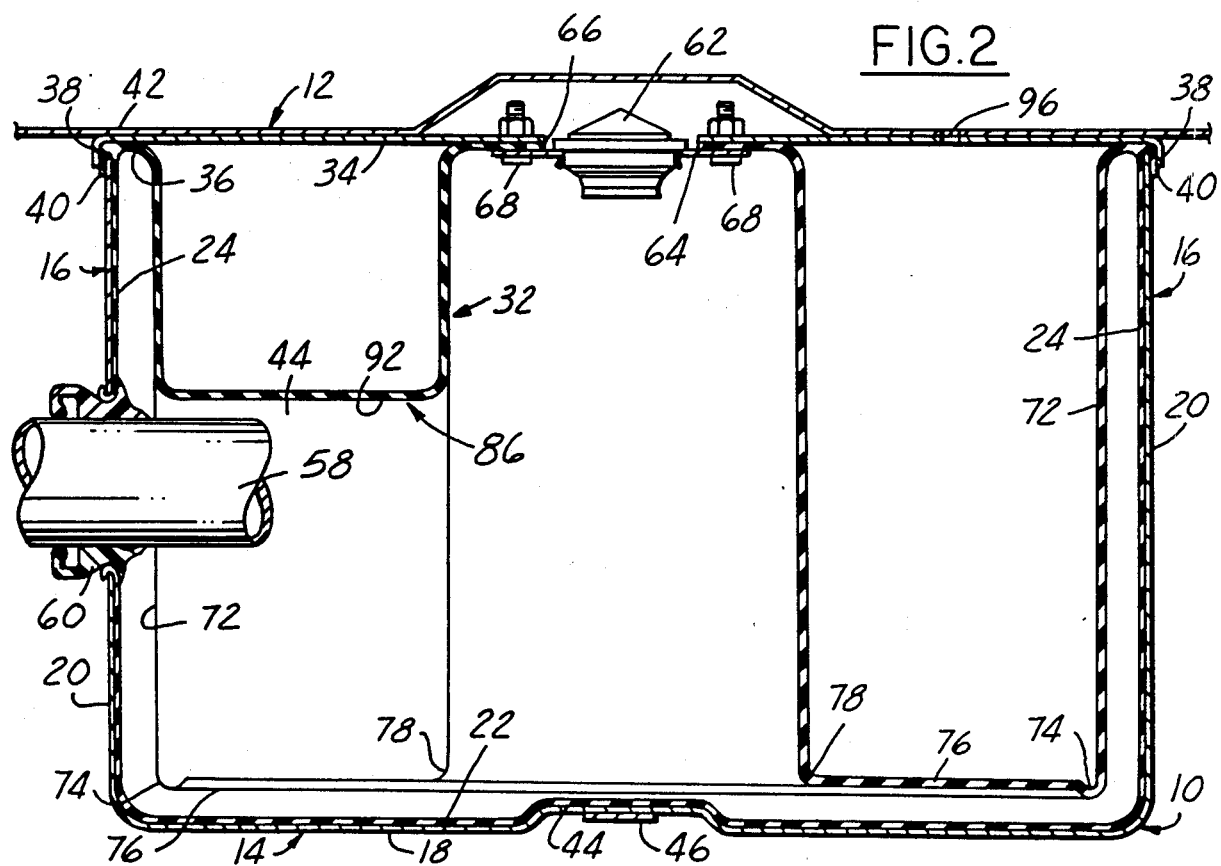

In FIGS. 1 and 2, a fuel tank 10 suitable for use in an automobile is shown. The fuel tank 10 has a top wall means 12, bottom wall means 14 and side wall means 16. The bottom and side wall means are formed in two layers as best shown in FIGS. 1 and 2. An outer enclosure of metal has a generally cup-shaped or open ended configuration with a bottom wall portion 18 and side wall portions 20. The portions 18, 20 are integrally formed of metal which is drawn into the desired cup-shaped configuration.

An inner enclosure of the two layer fuel tank is integrally molded of synthetic material and forms a thin interior layer which is resistant to attack by water, fuel and the like. The synthetic material is flexible so as to overlie the outer metal walls. This inner enclosure consists of a bottom wall portion 22, side wall portions 24 as well as a movable top wall 32 which generally moves along with changes of liquid fuel within the tank as will be further discussed hereinafter. This two layer structure forms a leak resistant fuel tank structure.

An exterior or outer top 34 of the fuel tank is shown in FIGS. 2 and 3. It is a substantially flat sheet metal member which overlies an upper edge portion 36 of the inner side wall 24. A peripheral edge portion 38 of the top 34 is formed normally to the planar extent of the remainder of the top to encircle the upper edge portion 36 of the side wall 24.

The integral bottom, top and side inner layers of synthetic material are configured to lie on the inside of the outer portions of the fuel tank. An integral strip 40 overlies the upper edge of the metal side wall 20. This strip 40 rests between the upper edge of the side walls and the edge 38 of the top 34 and is slightly compressed therebetween.

The outer top 34 is seated against a horizontally and generally planar vehicle body member 42. This greatly rigidifies the top structure including the metal member 42. The bottom structure of the tank, specifically the portion 18 has an inwardly formed channel 44 therein shown in FIGS. 2 and 3. The channel 44 provides means for locating a support strap 46 to extend therethrough. The upper ends (not shown) of the support strap 46 is secured to the vehicle member 42 or other appropriate mounting structure.

The tank 10 has aperture means through the side wall structure for removing fuel from the tank as shown in FIG. 1. Specifically, an outlet nipple 50 of a tube 52 extends from the side of the fuel tank for connection to a flexible fuel hose (not shown). The tube 52 is attached to a plate 54 which in turn is mounted over an opening in the side wall of the fuel tank. A plurality of fasteners 56 secure the plate to the fuel tank.

As shown in FIGS. 2 and 3, the tank 10 has another aperture means through the side wall structure for the purpose of introducing fuel to the interior of the tank. The fuel input apparatus includes a filler tube 58 which has an elastomeric seal member 60 therearound. The outward or leftward end of the filler tube (not shown) has an inlet opening for receiving fuel and is normally covered by a filler cap as is common in the vehicle fuel tank art.

A combination roll-over and vapor vent device 62 is attached through the top wall 34 of the fuel tank 10. Specifically, the device 62 is secured in an opening through a mounting plate 64. Plate 64 is attached over another opening 66 in the top of the fuel tank by fasteners 68. The device 62 has a generally hollow body with an outlet or nipple fitting 70 as can be seen in FIG. 1. The fitting 70 is adapted to be connected to a vapor storage device as commonly used in motor vehicles. For an even more complete description of the mounting of device 62, reference is made to the above identified U.S. Pat. No. 4,625,980 to Lyzohub.

The subject fuel tank is an improvement over the above identified Lyzohub patent. Specifically, the inner layer of the two layer tank has a top portion 32 which is configured so that it acts as a movable wall or bladder. This bladder separates fuel from air space in the fuel tank interior. It would be ideal if the bladder could totally separate liquid fuel from air with almost no fuel vapor space above the liquid fuel. However from a practical standpoint there is always a slight volume of air and fuel vapor above the liquid fuel. A primary purpose of providing a bladder in the subject fuel tank is to minimize this air-fuel space. Resultantly, problems with leakage to the atmosphere should be lessened and the vapor storage means used to handle fuel vapor may be made smaller and more effective.

The inner layer of synthetic material and specifically the top portion 32 is configured as shown in FIGS. 1-3. Also, a perspective view of portion 32 broken away from the remainder of the inner layer is shown in FIG. 4. The upper edge portion 36 of the side wall 24 is integrally connected to a downwardly directed wall 72 having a generally cylindrical configuration as shown in FIG. 4. A lower edge 74 of the wall 72 integrally connects a bottom wall 76 to the side wall 72. Bottom wall 76 extends inwardly in the axial direction and then is integrally connected at edge portion 78 to an upwardly extending wall 80. The upper end portion 82 of wall 80 extends between top plate 34 and the mounting plate 64. This secures the central portion of the bladder to the fuel tank.

The extension of outlet tube 52 and filler tube 58 into the fuel tank interior creates an obstruction to the walls of the bladder 32. Accordingly, the bladder 32 is configured with channels 84 and 86 which extend about the tubes 52 and 58 respectively. Specifically, one channel 84 forms an arch about outlet tube 52 and includes upper wall 88 and side walls 90 as shown in FIGS. 1 and 4. Likewise, another channel 86 forms an arch about the filler tube 58 and includes an upper wall 92 and side walls 94 as shown in FIGS. 2 and 4.

The fuel tank is shown in an empty condition in FIGS. 1 and 2 and in a full condition in FIG. 3. In the empty condition, the walls 72 and 80 extend downward in a substantially straight manner generally parallel to the side walls of the tank. The bottom wall 76 is located near the bottom wall 14 of the tank. The annular space 95 between the walls 72 and 80 is air space and is at a maximum volume. The walls 72, 80 and 76 separate the fuel from the air.

As the fuel tank is filled with liquid fuel through the filler tube 58, the rising liquid level causes the bottom wall of the portion 32 to move upward. In FIG. 3, the fuel tank 10 is shown in a nearly full condition in which the bottom wall is moved upward to a position just beneath the top member 34. This movement reduces the volume of space 95 and the air therein is expelled through a bleed passage 96 which is formed in the top members 34 and 42. The reduction is volume of the central space inside of the wall 80 is expelled through the roll-over and vent device 62. This space may also be partially filled by an in-tank fuel pump (not shown) which is commonly used in modern vehicle fuel tanks.

The above described upward movement of the bottom wall 76 when the tank is filled and opposite downward movement thereof when the tank is emptied is accommodated by a corresponding rolling of walls 72 and 80 back over themselves as shown by numeral 74' and 78' in FIG. 3. To encourage this rolling action, the edge portion 74 between the walls 72 and 76 is mold formed with a pre-curvature of more than about ninety degrees as shown in FIG. 2. Resultantly, the bottom wall 76 is raised slightly relative to the lowest extent of edge 74 for the purpose of initiating the rolling action as the rising fuel level moves bottom wall 76 upward.

During the aforedescribed movement of the walls 72, 76 and 80, the arches defined about the tubes 52 and 58 particularly by upper walls 88 and 92 respectively are mostly unaffected by the movement of the other walls. This is due to the large spacing of these upper walls relative to the bottom of the tank as can be seen in FIG. 3. Also, the edge adjacent the walls 88 and 92 lacks the premolded curvature as is provided the edge 74. Although the space above walls 88 and 92 is unaffected by the filling of the tank, the filling efficiency of the tank is very good as this volume is relatively small.

Although the preceding detailed description of the two layered fuel tank with the integral bladder is specific to only the one embodiment shown in the drawings, the invention is not necessarily limited to the specific embodiment as shown and described, as the claims define the invention. It should be understood that the specific embodiment of the fuel tank is subject to modifications such as overall shape and size which result in a fuel tank which does not fall outside the scope of the following claims which define the invention.

I claims:

1. A fuel tank for a vehicle, comprising: an outer enclosure of sheet metal material including a bottom wall, a top wall and a side wall thereby defining an interior space; a liner of resilient sheet material having a lower wall, an upper wall and a side wall which extends therebetween, the lower and side walls being located in overlying relation to the bottom and side walls of the outer enclosure; the upper wall of the liner having a molded non-planar configuration including a first wall portion depending from the upper edge of liner's side wall, a second wall portion located radially inward in the tank from the first wall portion, and an intermediate wall portion extending between the first and second wall portions, the first and second wall portions extending in substantial parallelism with the tank's side wall; the second wall portion having an upper edge portion affixed to the top wall of the outer enclosure, whereby the liner's top wall separates the interior of the enclosure into a fuel space and an air space; edge means connecting the first and intermediate wall portions configured to urge the first wall portion to fold and roll back upon itself when the intermediate portion is moved upward away from the tank's bottom wall as the fuel level increases.

2. A fuel tank for a vehicle with a movable bladder to separate fuel space from air space, comprising: an outer enclosure of sheet metal material including a bottom wall, a top wall and a side wall thereby defining an interior space; a liner of resilient sheet material having a lower wall, an upper wall and a side wall which extends between the lower and upper walls, the lower and side walls of the liner overlying the bottom and side walls of the outer enclosure; the upper wall of the liner having a non-planar molded configuration which permits movements thereof in response to changes in the liquid fuel level in the tank thereby producing a variable volume fuel space and air space, the liner's upper wall including a first wall portion extending from an upper edge of the liner's side wall and extending downward therefrom in substantial parallelism to the side wall and a second wall portion extending substantially parallel to the first but radially inward therefrom and an intermediate wall portion integrally connecting the lower edges of the first and second wall portions; the integral connection between the first wall portion and the intermediate wall portion being mold formed into a rounded configuration so that upon upward movement of the intermediate wall means from a lowermost position, the first wall folds back over itself and subsequently rolls over an adjacent portion thereof.

3. The fuel tank of claim 2 in which a radially extending member projects into the tank interior and the mold formed top wall of the liner is configured to provide clearance for the member by a mold formed arch in the first and second wall portions including a non-movable upper wall extending parallel to the intermediate wall but spaced upward therefrom.

4. The fuel tank of claim 2 in which the mold formed connection has a rounded curvature of greater than ninety degrees and the intermediate wall extends substantially parallel to the bottom of the fuel tank but slightly upward from the rounded curvature.

* * * * *